UNITED STATES PATENT OFFICE

FREDERICK M. BECKET, OF NEW YORK, N. Y., ASSIGNOR TO ELECTRO METAL-LURGICAL COMPANY, A CORPORATION OF WEST VIRGINIA

SMELTING PROCESS

No Drawing.   Application filed May 3, 1929. Serial No. 360,319.

The invention is a process for smelting metal-containing substances, such as ores, concentrates, chemically prepared metal compounds, and metalliferous slags, for the recovery of their values. The invention is particularly applicable to the production of low-carbon ferroalloys of those metals which readily take up carbon, for example chromium, manganese, vanadium and molybdenum; but it can also be used in preparing other alloys and commercially pure metals.

Several methods have heretofore been used for preparing carbide-forming metals and their alloys in the low-carbon state. In one such method the metal is initially reduced in the presence of silicon, so that the latter combines with the metal to form an alloy high in silicon and low in carbon; and this alloy is then refined or desiliconized by heating it with a metal oxide reactive with the silicon of the alloy. In another method a compound of a carbide-forming metal is reduced with aluminum in a self-propagating exothermic reaction.

Silicon, a cheaper reducing agent than aluminum, has been proposed for the self-propagating reduction of certain easily reducible oxides, but under many conditions silicon tends to give a sluggish and incomplete reaction, especially where the compound to be reduced has a high heat of formation or is associated with gangue or other impurity which does not react exothermically with silicon, but which nevertheless must be heated to the temperature attained in the reaction. Indeed it appears to have been supposed by some that the silicon reduction of such oxides as that of chromium is endothermic. I have found, however, that it is quite possible to reduce the oxides of the various carbide-forming metals by self-propagating silico-thermic reduction, even when the oxides are associated with considerable proportions of inert materials, as in ores. In carrying out such reductions, it is often necessary strongly to "promote" the reaction, as by incorporating in the charge an excess of silicon and a substance containing loosely combined oxygen and adapted to react with the excess silicon in an intensely exothermic way.

Even though it can be made self-propagating, silico-thermic reduction involves certain disadvantages which are not encountered, or are less serious, when aluminum is used as the reducing agent. Silcon alloys freely with the carbide-forming elements, so that the metal produced by silico-thermic reduction normally contains more or less silicon. The reaction goes very rapidly, and once it starts it is practically impossible to modify its course. Hence the product must be controlled solely by the composition of the charge. This circumstance renders it difficult to make a product having an accurately predetermined silicon content with good recovery of metal.

In accordance with my invention it is possible to regulate the silicon content of the product precisely without abandoning the advantages of a self-propagating reaction or the additional advantage of a cheap reducing agent for use therein.

I attain the foregoing object by proportioning the charge for the self-propagating reaction so that the metal produced will certainly contain a considerable percentage of silicon, and I then oxidize this silicon, or any chosen part of it, by means which are readily controllable. Since a larger excess of silicon favors a more complete reduction of the metal compound involved in the self-propagating reaction, this factor may be taken into account in determining the excess of silicon to be used.

The product of the self-propagating reaction can be treated in various ways for the removal of its excess silicon. It may be subjected, in molten condition, to an oxidizing blast, for example a blast of air or oxygen, or air enriched in oxygen. Several methods are available by which the progress of the desiliconization may be followed throughout the blow. Knowing the initial weight and composition of the alloy to be blown, and the volume and composition of the blast supplied, it is possible with some degree of certainty to calculate the time required to bring the silicon to a predetermined value. Confirmation of the progress of the blow can also be had by inspecting the fracture of samples taken from time to time.

Another method for desiliconizing the product of the self-propagating reaction is to treat the metal with a solid oxide reducible by silicon, heating the metal and oxide by any suitable means, but preferably by electrical energy, to induce the desired reaction. As a solid oxide for this purpose, iron oxide or an oxide of the metal reduced in the self-propagating stage naturally suggest themselves, since the oxide must not on reduction produce a metal which will contaminate the alloy under treatment. The oxide used in the charge for the self-propagating reaction can in general be employed in the refining step, but an entirely different oxide may be used so as simultaneously to desiliconize the alloy and introduce an element not previously present. Thus, where the original charge contains chromite, and the product of the self-propagating reaction is a ferrochromium containing silicon, the silicon may be oxidized with an additional quantity of chromite, or with mill-scale or other form of iron oxide, or with more or less pure chromic oxide, or it may be treated with another metal oxide, so as to incorporate the corresponding metal into the alloy.

As a rule the slag produced in the self-propagating stage will be unsuitable for the desiliconizing stage because of its acidity, and because of its low content in oxides reducible by silicon. When this is the case the reduced metal should be separated from this slag and treated with a new slag sufficiently rich in desiliconizing oxides. The refining may be carried out in the vessel in which the self-propagating reaction took place, or the metal may be transferred to another furnace in which it is preferably desiliconized before permitting it to solidify.

The refining (desiliconizing) charge is desirably fed gradually onto the silicon-containing alloy, with the power on, at a rate not faster than that at which the charge can be melted. A high concentration of the refining oxide in the refining slag expedites the desiliconization and is usually preferred. Rapid refining is also favored by the inherent tendency of the silicon to segregate at the top of the silicon-containing alloy. Whether the refining is effected by elemental oxygen or with solid oxides, inspection of the fracture of a test ingot of the metal may be a sufficient indication that the process is finished.

The self-propagating reaction is usually complete in five to twenty minutes, while refining by the solid oxide method may require one to three hours, depending on the quantity of charge, initial silicon content of the silicon-containing alloy and other controllable factors. In order to shorten the refining period, it is desirable in the case of some alloys to operate in this part of the process at as high a temperature as the furnace lining will satisfactorily withstand.

The silicon used in the self-propagating stage may be commercially pure, or it may be alloyed with the element or elements which are to be present in the final alloy, it being of course understood that when a silicon alloy is used the silicon content is high enough to sustain a self-propagating reaction and bring about the requisite freedom from carbon. In making low-carbon ferrochrome, the silicon used in the self-propagating reaction is preferably a ferrochrome silicon containing at least 40% of silicon. The total quantity of silicon in the charge is usually adjusted to give a silicon content of 5% to 10% in the product of the self-propagating reaction, but either more or less may be incorporated. One factor which must be considered in this connection is the cost of the ore or other compound used as a raw material. If this cost is low some sacrifice of recovery of metal may be tolerated in the first stage in order to curtail the duration and expense of the refining stage; whereas with a high-priced raw material, like a vanadium concentrate, it is economical to produce a high-silicon product, requiring a more prolonged refining operation, in order to insure a high recovery of vanadium in the self-propagating stage. If a high recovery is not sought in the first stage it is sometimes desirable to aim for a recovery low enough to give a slag rich in metal, which may be processed for its values. The slag from the refining stage may be reworked if its values warrant such a step. The slags may be smelted to produce silicon alloys to be used in the self-propagating reaction, or they may be worked up into other valuable products.

Lime or other flux may be added to the silico-thermic charge to render the slag more fluid, or to mitigate its attack on the refractory lining of the reaction vessel. The ingredients of the silico-thermic charge should be finely ground, so that at least 90% will pass a 100 mesh screen, and should be thoroughly dried and mixed. The charge can be ignited in any of the usual or suitable ways, among which may be mentioned the gradual feeding of the charge into a preheated furnace, which may contain a bath of molten metal or slag. When solid oxides are used for refining, the refining charge need only be crushed to such size as will promote rapid melting.

A basic slag tends to expedite the refining operation, and the latter is preferably carried out in a basic lined furnace. I prefer to add enough lime to the refining charge to maintain throughout a $CaO/SiO_2$ ratio of at least 1.5.

The following examples will serve to illustrate the procedure:

Example I

The following silico-thermic mixture was charged into a refractory-lined furnace shell containing a small bath of molten slag to start the reaction. The ingredients of the charge were ground to pass a 100 mesh screen.

| | Parts |
|---|---|
| Rhodesian chrome ore | 4000 |
| Ferrochrome-silicon | 2460 |
| Sodium nitrate | 1170 |
| Lime | 130 |
| | 7760 |

The ferrochrome-silicon analyzed:

| % Cr | % Si | % Fe | % C |
|---|---|---|---|
| 33.89 | 51.18 | 13.90 | 0.03 |

The chrome ore contained approximately 34% Cr.

After approximately 15 minutes the self-propagating reaction was complete, and the acid slag was removed through a tap hole.

The resulting alloy contained 6% of silicon. Electric power was then applied to the furnace and the following refining batch was charged in one hour and ten minutes.

| | Parts |
|---|---|
| Rhodesian chrome ore, 10 mesh | 1600 |
| Lime, ½ inch and coarser | 1600 |

Refining was continued for one hour and twenty minutes (although the silicon was under one per cent in less than one hour) and the products were tapped and separated. The alloy analyzed:

| % Cr | % Si | % C |
|---|---|---|
| 71.35 | 0.09 | 0.06 |

Example II

A charge of silico-thermic mixture, made up as shown below, was fed to a previously heated magnesia-lined furnace shell. The ingredients of the charge were ground to pass a 100 mesh screen.

| | Parts |
|---|---|
| Vanadium oxide | 1125 |
| Ferrosilicon | 1170 |
| Sodium nitrate | 117 |
| Lime | 138 |
| Total | 2550 |

The raw materials analyzed as follows:
Vanadium oxide

| % V$_2$O$_5$ | % Na$_2$O |
|---|---|
| 88.24 | 8.63 |

Ferrosilicon 59.16% Si

The self-propagating reaction was complete in ten to twelve minutes, the resulting alloy containing 20% Si. The acid slag was removed and the alloy refined with two successive refining batches, as follows:

First refining batch

| | Parts |
|---|---|
| Vanadium oxide | 375 |
| Low-carbon iron | 375 |
| Lime | 1850 |
| | 2600 |

The low-carbon iron was added to adjust the percentage of vanadium in the alloy.

Second refining batch

Iron ore _____ 150 parts

The first refining batch was charged in two hours and twenty minutes. Most of the slag was then removed and the second refining batch was fed and refining continued for one hour and thirty minutes. Metal and slag were tapped into pots and separated when cold. The alloy analyzed:

| % V | % Si | |
|---|---|---|
| 36.31 | 1.88 | Balance largely Fe |

The slag from the self-propagating step of the process contained 3.02% vanadium, as did also the slag from the second refining batch, and these slags were reworked for recovery of values. The slag from the first refining batch was very low in vanadium and was discarded. A total of 92.9% of the vanadium charged was recovered of which 81.6% was recovered in alloy and 11.3% in slags to be reclaimed by reworking.

Having now described my invention, what I claim is:

1. The process of producing metallic compositions of controlled silicon content which comprises reducing a metal compound by a self-propagating silico-thermic reaction in a charge containing enough silicon to provide an excess in the reduction product; and then subjecting said product to regulated oxidation until the silicon content has been diminished to the desired value.

2. The process of producing metallic compositions of controlled silicon content which comprises reducing a metal compound by a self-propagating silico-thermic reaction in a charge containing enough silicon to provide an excess in the reduction product; and then heating said product in contact with a metal oxide reactive with silicon until the silicon content has been diminished to the desired value.

3. The process of producing metallic compositions of controlled silicon content which comprises reducing a compound of the herein described group of carbide-forming metals comprising chromium, manganese, vanadium and molybdenum by self-propagating silico-thermic reaction with a silicon alloy of a metal of said compound, the silico-thermic charge containing enough silicon to provide an excess in the reduction product; and then subjecting said product to regulated oxidation until the silicon content has been diminished to the desired value.

4. The process of producing metallic compositions of controlled silicon content which comprises reducing a metal compound by self-propagating silico-thermic reaction with a silicon alloy of a metal of said compound, the silico-thermic charge containing enough silicon to provide an excess in the reduction product; and then heating said product in contact with an oxide of a metal present in metal present therein until the silicon content has been diminished to the desired value.

5. The process of producing low-carbon metallic compositions of controlled silicon content which comprises reducing a metal compound by a self-propagating silico-thermic reaction in a charge low in carbon and containing enough silicon to provide an excess in the reduction product; removing the acid slag formed in the silico-thermic reaction; and then electrically heating the reduction product in contact with a metal oxide reactive with silicon until the silicon content has been diminished to the desired value.

6. The process of producing low-carbon chromium alloy which comprises reducing chrome ore by a self-propagating silico-thermic reaction in a charge containing enough silicon to provide an excess in the reduction product; and then subjecting said product to regulated oxidation until the silicon content has been diminished to the desired value.

7. The process of producing low-carbon chromium alloy which comprises reducing chrome ore by a self-propagating silico-thermic reaction in a charge containing enough silicon to provide an excess in the reduction product; and then electrically heating said product with an oxide of a metal present therein until the silicon content has been diminished to the desired value.

8. The process of producing low-carbon ferrochrome of controlled silicon content which comprises reducing chrome ore in a self-propagating reaction with ferrochrome silicon low in carbon in a charge containing enough silicon to provide an excess in the ferrochrome produced; and then electrically heating said ferrochrome with an oxide of a metal present therein until the silicon content has been diminished to the desired value.

9. The process of producing low-carbon chromium alloy of controlled silicon content which comprises reducing chrome ore in a self-propagating reaction with ferrochrome silicon containing at least 40% Si. using enough ferrochrome silicon to provide an excess of silicon in the reduction product; and then subjecting said product to regulated oxidation until the silicon content has been diminished to the desired value.

10. The process of producing low-carbon chromium alloy of controlled silicon content which comprises reducing chrome ore in a self-propagating reaction with ferrochrome silicon containing at least 40% Si, using enough ferrochrome silicon to provide an excess of silicon in the reduction product; and then electrically heating said product with chrome ore until the silicon content has been diminished to the desired value.

In testimony whereof, I affix my signature.

FREDERICK M. BECKET.